United States Patent
Swiatek et al.

[11] Patent Number: 5,482,624
[45] Date of Patent: Jan. 9, 1996

[54] FILTER CELLS PROVIDING LIFTING MEANS AND RELATED METHODS

[75] Inventors: Frank Swiatek; Richard Leavitt, both of Stafford Springs; Donald Chanski, Willimantic; Ronald V. Repetti, Guilford; Drew Willoughby, Rocky Hill, all of Conn.

[73] Assignee: Cuno Incorporated, Meriden, Conn.

[21] Appl. No.: 317,911

[22] Filed: Oct. 4, 1994

[51] Int. Cl.[6] .................................................. B01D 35/00
[52] U.S. Cl. ...................... 210/238; 210/323.1; 210/470; 210/437
[58] Field of Search ..................... 210/470, 471, 210/237, 238, 323.1, 437

[56] References Cited

U.S. PATENT DOCUMENTS

| | | | |
|---|---|---|---|
| 2,353,433 | 7/1944 | Auberschek | 210/238 |
| 2,731,155 | 1/1956 | James | 210/470 |
| 2,757,802 | 8/1956 | Schmid | 210/237 |
| 2,781,914 | 2/1957 | De Voe | 210/238 |
| 3,666,107 | 5/1972 | Boggs et al. | 210/238 |
| 4,007,113 | 2/1977 | Ostreicher . | |
| 4,007,114 | 2/1977 | Ostreicher . | |
| 4,132,641 | 1/1979 | Elsworth | 210/238 |
| 4,305,782 | 12/1981 | Ostreicher et al. . | |
| 4,309,247 | 1/1982 | Hou et al. . | |
| 4,347,208 | 8/1982 | Southall . | |
| 4,361,486 | 11/1982 | Hou et al. . | |
| 4,617,128 | 10/1986 | Ostreicher . | |
| 4,669,167 | 6/1987 | Asterlin | 210/238 |
| 4,881,313 | 11/1989 | Artinyan et al. . | |
| 4,921,606 | 5/1990 | Guldman | 210/470 |
| 5,045,194 | 9/1991 | Gershenson | 210/470 |

*Primary Examiner*—Peter A. Hruskoci
*Assistant Examiner*—Theodore M. Green
*Attorney, Agent, or Firm*—Renner, Kenner, Greive, Bobak, Taylor & Weber

[57] ABSTRACT

Filter cartridge assemblies (10) comprising at least one filter cell (12) having an aperture (18) therethrough; a retainer ring (22) securably disposed on the filter cell and concentric with the aperture; and a lifting device (42, 50, 70, 80, 90) in communication with the retainer ring. A device for lifting and carrying a filter cell (12) comprising a retainer ring (22); and a lifting device (42, 50, 80, 90) in communication with the retainer ring. A method for the assembly of a cell-type filter cartridge device (10) comprising the steps of providing a filter housing (28) for at least one filter cell (12), the filter housing having a removable opening, an inlet and an outlet; providing at least one filter cell, the cell having an aperture (18) communicable with the outlet and a retainer ring (22) secured to the cell and providing a lifting device (42, 50, 80, 90); depositing the filter cell into the filter housing; and fastening the removable opening to the filter housing. A method for removing a filter cell cartridge assembly (10) from a filter housing (28) having a removable opening, an inlet and an outlet; the cartridge assembly providing at least one filter cell (12) having an aperture (18) communicable with the outlet and a retainer ring (22) in communication with the cell comprises the steps of detaching a section of the filter housing; securing a device for lifting (80) to the retainer ring; and lifting the filter cell out of the filter housing with the lifting device.

16 Claims, 4 Drawing Sheets

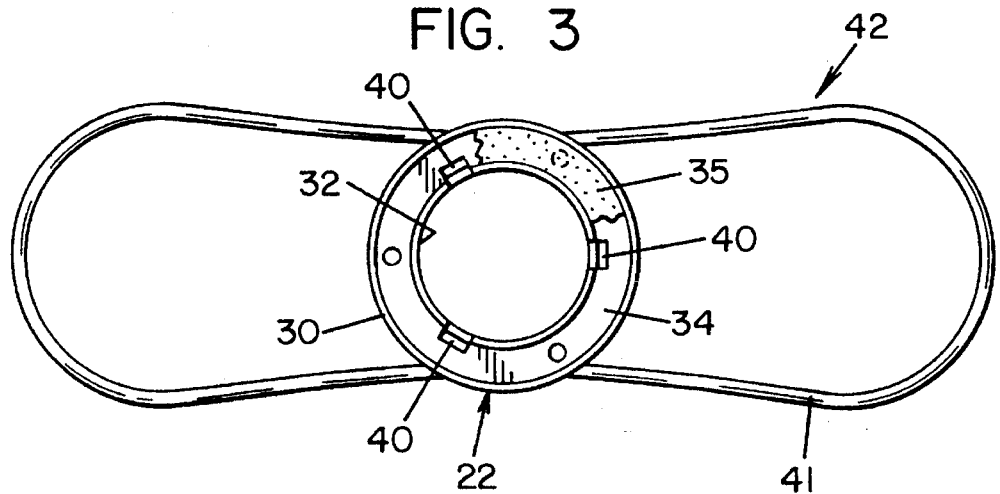
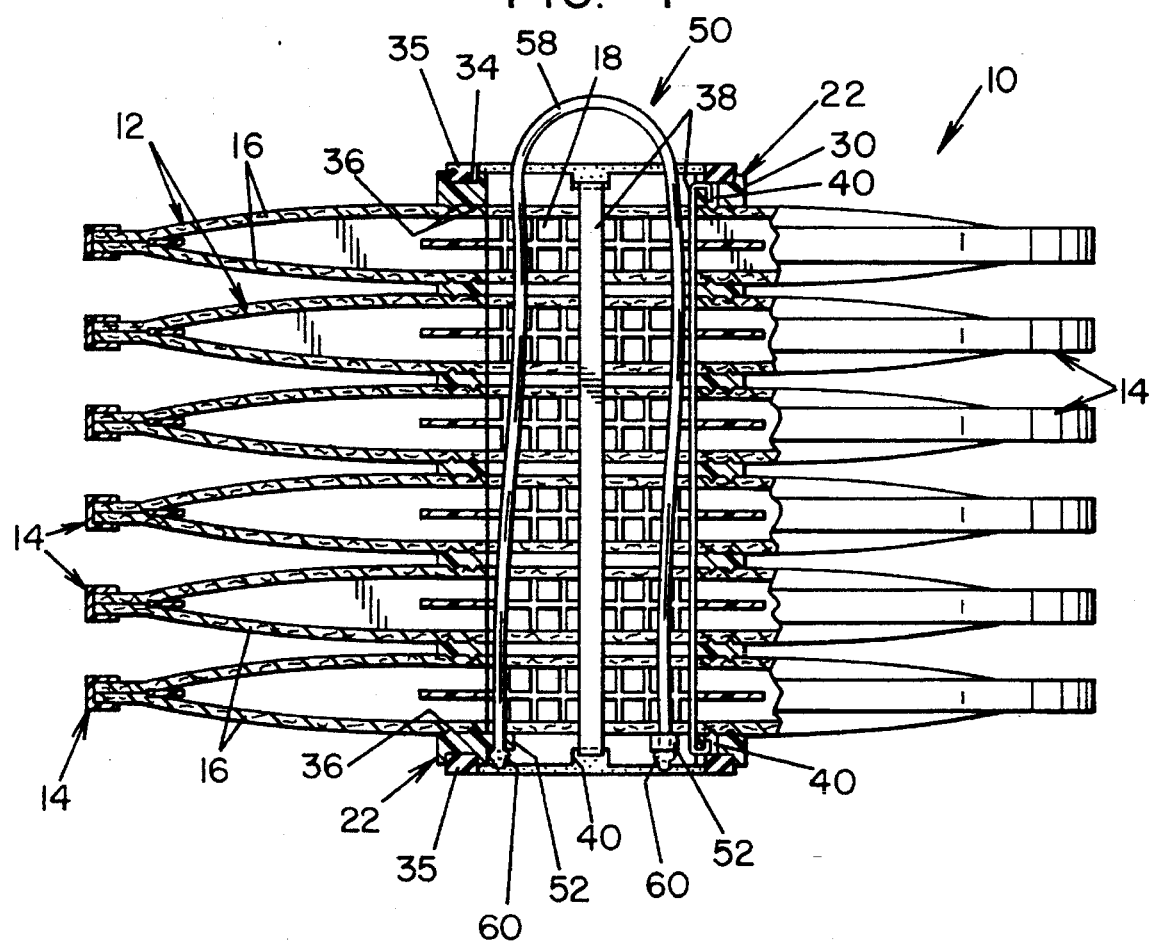

FILTER CELLS PROVIDING LIFTING MEANS AND RELATED METHODS

TECHNICAL FIELD

The present invention is related in general to cell-type filter cartridges having means to assist in the removal thereof from a filter housing in which the cartridges are held. More particularly, the present invention provides a handle to assist in removing cell-type filter cartridges from a filter housing in such a manner that the integrity of the cartridge or cartridges is maintained. Use of the filter cartridge handle in this manner is beneficial in preventing damage to the filter cartridge. Methods are also provided for the assembly of a cell-type filter cartridge device and for removing cell-type filter cartridges from their filter housing.

Background Art

Cell-type filter cartridges have long been known and are increasingly used in a variety of situations. These type of filter cartridges are typically fabricated from individual cells generally having two layers of filter media separated from each other. Liquid typically flows from the outside of the filter medium into the space between the layers of the filter media toward the central portion of the cell. A significant advantage to cell-type filter cartridges is that the surface area of filter material is quite large when compared to the total volume of an assembled cell-type filter cartridge.

Disposed between each filter medium is a separator which is typically formed in the shape of disks having ribs radially extending from the central aperture in a spoke-like pattern. In addition to separating the two layers of filter media, it provides for fluid flow from the filter media toward the central aperture of the filter media.

The separator disk has stiffening members formed at the central aperture of the cell which are attached to a plurality of separating ribs to provide a rigid, box-like structure sufficient to impart substantial cantilever strength to the ribs. Further, one of the stiffening disks is positioned proximate the ends of the separator ribs in order to act as a loadbearing surface to prevent media intrusion of the filtering medium and to prevent blocking the area of the flow path with the filtered liquid. Accordingly, one distinct advantage in this type of separator is that during backwashing or reverse flow (i.e., fluid flow from the central aperture of the filter cell out toward the surface of the filter medium) damage to the filter media is minimized or ameliorated.

Filter cartridges use a variety of filter media for filtering many fluids. Examples of such media and uses may be found, for example, in U.S. Pat. No. 4,617,128 "Particulate Filter Aid, Filter Bed Process" dated Oct. 14, 1986, to Ostreicher; U.S. Pat. No. 4,309,247 "Filter and Method of Making Same" dated Jan. 5, 1982 to Hou et al.; U.S. Pat. No. 4,305,782 "Filter and Method of Making Same" dated Dec. 15, 1981 to Ostreicher et al.; U.S. Pat. No. 4,007,113 "Particulate Filter Medium and Process" dated Feb. 8, 1977 to Ostreicher; and U.S. Pat. No. 4,007,114 "Fibrous Filter Medium and Process" dated Feb. 8, 1977 to Ostreicher. All of the foregoing patents are incorporated herein by reference.

Use of a cell-type filter cartridge may be also found in U.S. Pat. No. 4,361,486 "Filter Media, Method for Oxidizing and Removing Soluble Iron, Method for Removing Inactivating Microorganisms and Particulate Filter Aid" issued Nov. 30, 1982 to Hou et al. which is incorporated herein by reference.

A process for manufacturing filter cells is described in U.S. Pat. No. 4,347,208 "Method of Making filter Cell Having Sealed Periphery" issued Aug. 31, 1982 to Southall. In this patent, a filter cell cartridge is described which comprises a plurality of filter cells. Each of the filter cells is comprised of filter media having a conical separator therebetween with the periphery or edges of the filter cell being held together and sealed by an injection-molded flange.

A method for disposing a netting or mesh on the outside of the filter material is disclosed in U.S. Pat. No. 4,881,313 "Method of Forming a Cell Filter With an Exposed Surface" issued to Artinyan et al. In this patent, the surface area of filter exposed to unfiltered fluid has disposed thereon a netting thereby preventing flaking, cracking and the like of filter media during backflow or cleaning operations. The netting is secured to the cell by a molded circumferential retainer and a circumferential centrally disposed ring.

Generally, all of the aforementioned filter cartridges perform as anticipated during normal operating conditions. As can be expected after extended use, the filtering capacity of the filter media diminishes accordingly. The filter cartridges are replaced by grasping the periphery or edge of the uppermost filter cell, and then carefully lifting the attached filters away from the filter housing. This method relies on the strength of the bands, which interconnect the multiple filter cells, to prevent any one of the attached filter cells from breaking apart. Alternatively, if the construction of the filter housing permits, the bottom filter may be grasped around its periphery and then removed by carefully lifting the cartridge up and out of the filter housing. Both of the aforementioned methods are problematic because of the increased weight of a wet filter cartridge as compared to the weight of a dry filter cartridge. This increased load is generally concentrated toward the center of the cartridge, thus resulting in the likelihood of the cartridge separating during the lifting operation.

A wet filter cartridge that breaks during removal from a filter housing causes several problems. Primarily, if the cartridge breaks while still in the vicinity of the housing, the particulate matter removed by the filters may re-enter the housing, thus requiring additional cleaning operations in and around the housing.

Although it is common to provide a handle for lifting and carrying bulky items, the prior art does not disclose a handle that provides a method of attaching the handle to a wet, bulky, used filter cartridge. Nor does the prior art provide a filter cartridge with a handle integrally disposed thereon. The present invention provides such a handle, thereby increasing the convenience to and productivity of the technician utilizing the invention.

Disclosure of the Invention

It is therefore, an object of the present invention to provide a convenient method for removing a filter cell cartridge assembly from a filter housing.

It is another object of the present invention to provide a handle for lifting and carrying a filter cartridge that is integral therewith.

It is yet another object of the present invention to provide a handle for lifting and carrying a filter cartridge that is secured thereto prior to removal of the cartridge from the filter housing.

It is yet another object of the present invention to provide a convenient method for the installation of a cell-type filter cartridge device in the filter housing.

It is still another object of the present invention to provide lifting means for a filter cartridge so as to facilitate the replacement thereof in filter housings.

At least one or more of the foregoing objects, together with the advantages thereof over the known art relating to methods and handles for lifting and carrying filter cartridges, and which shall become apparent from the specification which follows, are accomplished by the invention as hereinafter described and claimed.

In general the present invention provides filter cartridge assemblies comprising at least one filter cell having an aperture therethrough; a retainer ring securably disposed on the filter cell and concentric with the aperture; and lifting means in communication with the retainer ring.

The present invention also provides means for lifting and carrying a filter cell comprising a retainer ring and lifting means in communication with the retainer ring.

The present invention also provides a method for the assembly of a cell-type filter cartridge device comprising the steps of providing a filter housing for at least one filter cell, the filter housing having a removable opening, an inlet and an outlet; providing at least one filter cell, the cell having an aperture communicable with the outlet and a retainer ring secured to the cell and providing lifting means; depositing the filter cell into the filter housing; and fastening the removable opening to the filter housing.

The present invention also provides a method for removing a filter cell cartridge assembly from a filter housing having a removable opening, an inlet and an outlet; the cartridge assembly providing at least one filter cell having an aperture communicable with the outlet and a retainer ring in communication with the cell comprises the steps of detaching a section of the filter housing; securing means for lifting to the retainer ring; and lifting the filter cell out of the filter housing with the lifting means.

BRIEF DESCRIPTION OF THE DRAWINGS

FIG. 3 is a top plan view of a handle which can be attached to or integrally molded to a retainer ring, which is interconnected with a top filter of the filter cell cartridge assembly;

FIG. 4 is a cross sectional view of a filter cell cartridge assembly of the type employed for practice of the present invention with a handle in communication with a bottom retainer ring of a filter cell cartridge assembly;

PREFERRED EMBODIMENT FOR CARRYING OUT THE INVENTION

Figure 1:
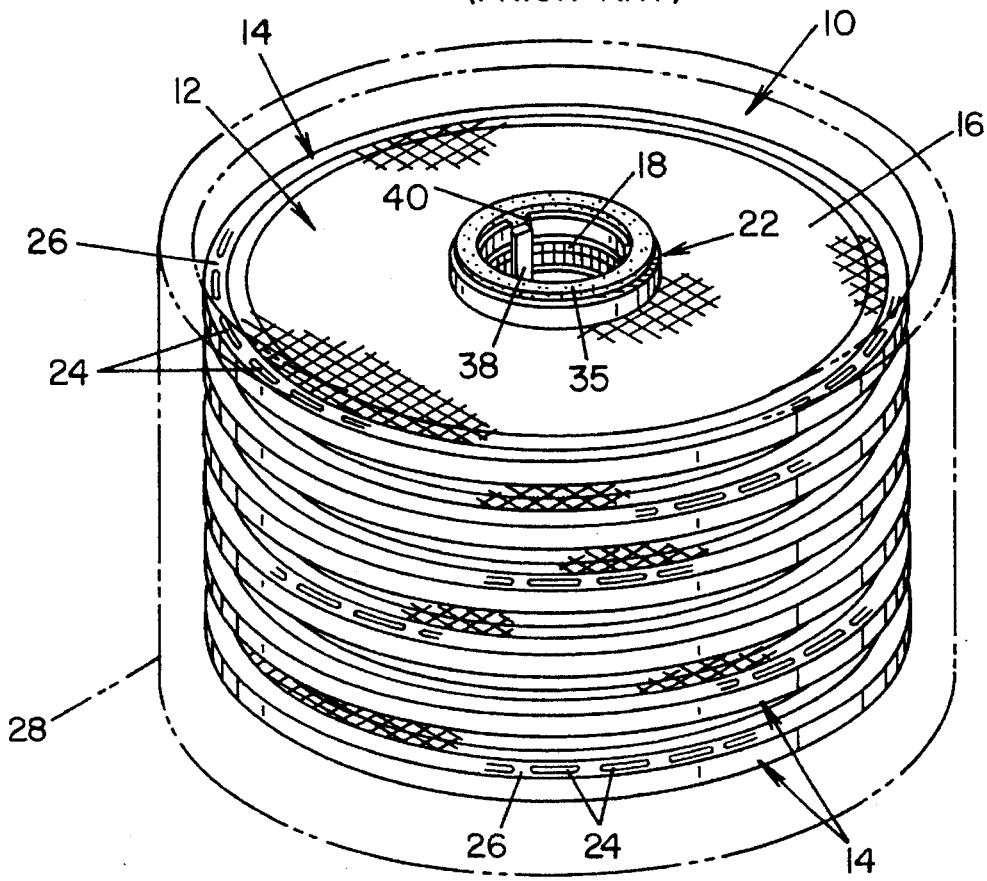
FIG. 1 is a perspective of a filter cell cartridge assembly of the type employed for practice of the present invention.
Figure 2:
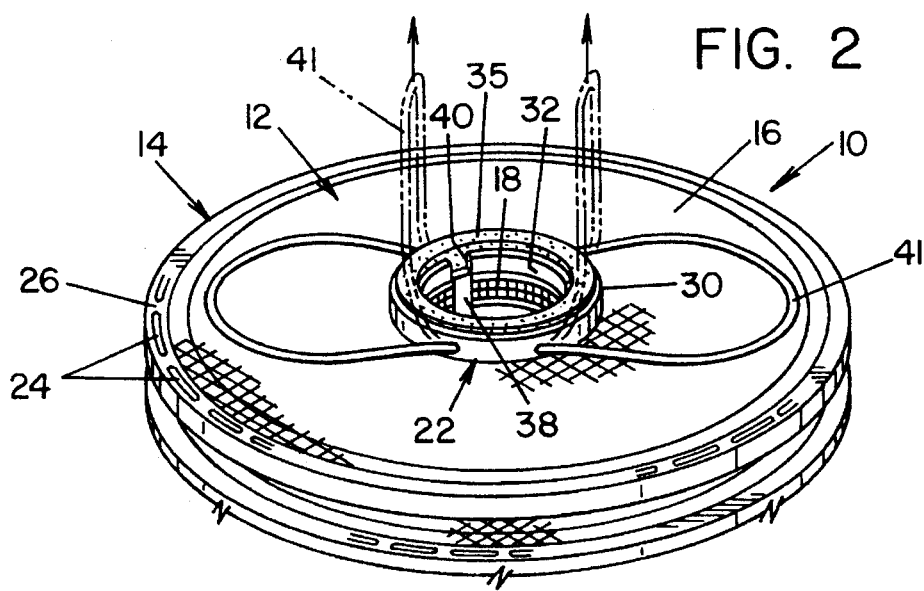
FIG. 2 is a perspective view of a portion of the filter cell cartridge assembly of the type employed for practice of the present invention with a handle in communication therewith.

With reference to the drawings, and in particular to FIGS. 1 and 2, the device employed for practice of the present invention is a filter cartridge assembly, referred to generally by the numeral 10. The assembly 10 will include at least one filter cell 12, and typically will consist of a plurality of filter cells interconnected as shown in FIG. 1.

As is well known in the art and as shown in FIG. 1, the filter cell 12 has an edge 14 that extends completely around the outer periphery thereof to securably fasten the frangible ends of the filtration media 16. In the preferred embodiment, the edge 14 is a plastic, injection molded construction. Although the filter cell 12 is shown having a circular construction, it should be appreciated that the shape thereof may be of any configuration desired to achieve the desired filtration process. As revealed in the incorporated patents, the filtration media 16 is used for the introduction of unfiltered fluid (not shown) which passes therethrough and exits through the center aperture or core 18. Disposed at either end of the assembly 10 is a retainer ring assembly 22. The edge 14 has a plurality of elongate slots or apertures 24 having spacer portions 26 disposed therebetween. The entire filter assembly 10 is disposed inside a chamber or filter housing 28, having an unfiltered fluid inlet for the chamber and a filtered fluid outlet connected to either one or both retainer ring assemblies 22.

With reference to FIG. 2, there is shown a perspective view of the retainer ring assembly, indicated generally by the numeral 22, that is disposed at either end of the filter assembly 10. The retainer ring assembly 22 comprises an end member 30, which is typically an annular component, that has an interior 32, concentric with the aperture 18. The end member 30 also has an annular trough 34 for receiving a gasket 35. The gasket 35 will provide a sealing interface between the retainer ring 22 and the inlet or outlet of the filter housing. Located opposite the side of the end member 30 that has the annular trough 34, are a plurality of annular ribs 36 (see FIGS. 4, 5 and 7) to provide continuous sealing edges and a fluid-tight fitting between the end member and the surface of the filtration media 16.

A plurality of bands 38 engage slots 40 in the retainer ring assembly 22 and extend from the top retainer ring assembly to the bottom retainer ring assembly and are used to form a rigid filter cell assembly 10. The bands 38 are preferably made of stainless steel, although another suitable material may be utilized. Further, it is possible to utilize a plurality of threaded bolts or the like extending through the filter cell assembly and suitably attached to the retainer ring assemblies 22 to form a rigid filter cell assembly 10.

Still referring now to FIGS. 2 and 3 it can be seen that integral with the top retainer ring assembly 22 is a lifting strap 41 which together provides lifting means 42. The material for the lifting strap, which is typically made of plastic, is rigid enough to support the weight of a wet filter cartridge assembly 10, while still allowing the strap 41 to be flexible for when it is manipulated to lift the assembly out of the filter housing 28. In the preferred embodiment, the lifting strap 41 has an oval configuration; however, it should be appreciated that the strap 41 may be configured in any shape that is conducive to lifting a wet cartridge assembly 10. Furthermore, although the strap 41 is shown integrally molded with the retainer ring 22, it is conceivable that lateral holes may extend through the end member 30 for receiving a flexible lifting strap which may then be used to lift the cartridge assembly 10. The opposing ends of such a lifting strap can be joined together by means of an electrical connector (not shown) or other comparable means.

Although not depicted, it is to be understood that an alternative means for lifting of the filter cartridge assembly could be achieved by providing the lifting means 42, depicted in FIGS. 2 and 3, with a longer strap 41 and affixing it to the bottom retainer ring 22. The loops of strap 41 would be passed through the cell apertures 18 to the top of the assembly where they would fit within the housing 28 and be available for subsequent grasping.

From the above description of the preferred embodiment the advantages thereof over the prior art should be readily apparent. As discussed in the background art, the wet filter cartridge assembly is removed from the filter housing by grasping the edge of the filter cells and lifting out. Unfortunately, the wet filter cells can be difficult to grasp and may tend to break when subjected to such manipulation. Because the lifting forces are directed around the periphery of the assembly and the majority of the load of the cartridge is directed toward the center thereof, the likelihood of a cartridge breaking during this method of lifting is increased.

There are several unfortunate consequences when a filter cartridge assembly breaks during removal. Primarily, unwanted filtered material may enter either the inlet or outlet of the filter housing. Thus, the technician responsible is required to spend additional time cleaning the housing. Furthermore, the entire filtration system must be flushed, thus adding expensive downtime to the attendant manufacturing process. Not only, does the present invention tend to eliminate these problems, but perhaps most importantly, it provides a means that makes filter cartridge removal easier than it has been.

Figure 5:
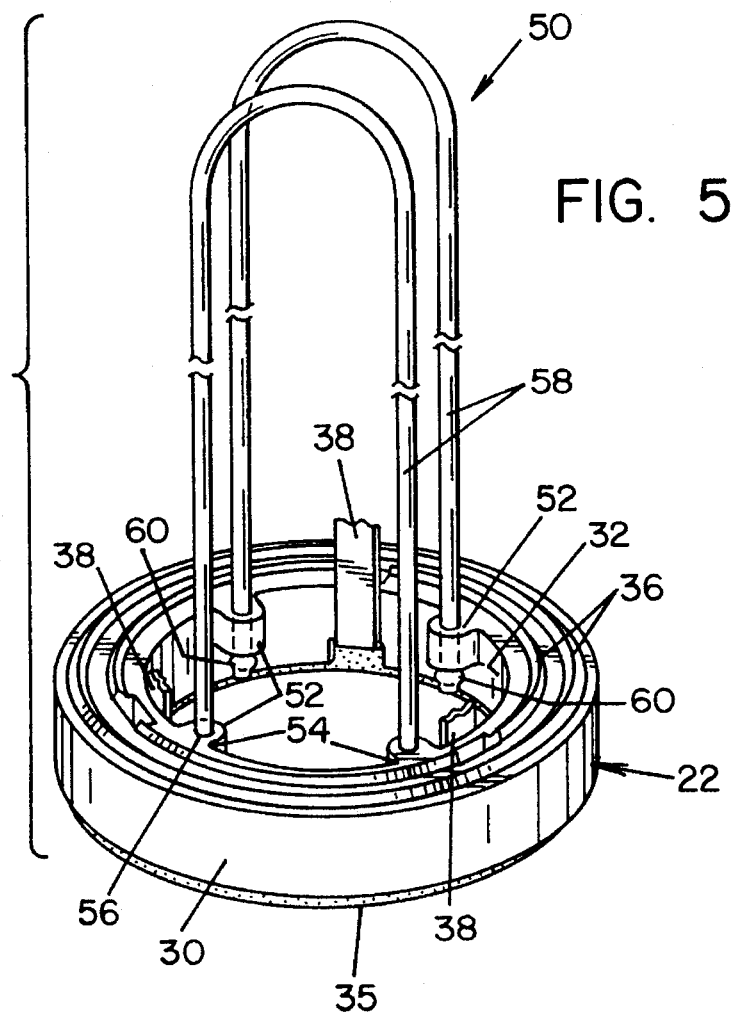
FIG. 5 is an exploded view of a handle interconnected to the bottom retainer ring of a filter cell cartridge assembly.

Of course, similar embodiments may be utilized to obtain the desired result of easy removal of a filter cartridge assembly. As seen in FIGS. 4 and 5, an alternative lifting means is depicted for lifting the cartridge assembly 10 up by the bottom retainer ring 22, and is generally designated by the numeral 50.

As best shown in FIG. 5, the interior 32 of the bottom retainer ring 22 has a plurality of inwardly extending bosses 52. A fillet 54 will provide a transitional area between each side of the boss 52 to the interior 32. It should be appreciated that there are an even number of bosses 52 disposed on the interior 32, with the preferred number of bosses being four. Moreover, each boss carries a hole 56.

A plurality of straps or handles 58 corresponding to the number of holes 56 are inserted through the entire length of the aperture 18. Of course, the length of each handle 58 is dependent upon the length of the filter cartridge assembly 10. Ideally, the length of the handle 58 is such that a sufficient amount will extend out from the top retainer ring assembly 22 so as to provide an adequate length for manipulating the filter cartridge assembly 10. Typically, each handle 58 will be a flexible plastic rod with the necessary tensile strength for lifting the wet filter assembly 10. Furthermore, the diameter of the plastic rod is less than the diameter of the hole 56. It should also be appreciated that the handle 58 could be a stranded or solid steel wire or other similar material. Each end of the handle 58 is inserted through the hole 56 and deformed to create a head 60 that has a diameter larger than the hole 56. Other methods of deforming the handle 58, such as tying a knot or crimping a lug thereon, may also be used. In order to prevent the handles 58 from slipping down, a plastic friction-fit bushing, stainless steel clip or the like (not shown), can be positioned immediately above the bosses 52, as will be appreciated by those skilled in the art.

Once each end has been deformed, the handles 58 may be grasped to lift the filter cartridge assembly 10 out of the filter housing. In addition to the aforementioned benefits of lifting the cartridge assembly 10 with a handle, this bottom lifting variation reduces the possibility of the bottom filter cell sticking to either the inlet or the outlet of the filter housing. As those skilled in the art will appreciate, if the cartridge assembly 10 breaks away from the bottom filter cell, the likelihood of distributing the filtered material about the filter housing is greatly increased. Furthermore, lifting a cartridge assembly 10 by the bottom retaining ring 22 greatly increases the stability of the assembly during the lifting process.

Figure 6:
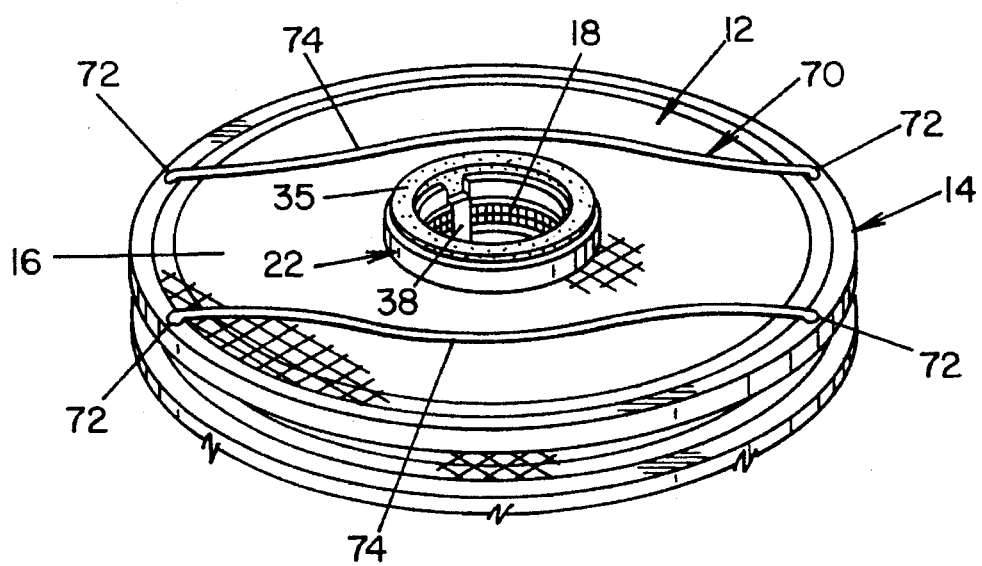
FIG. 6 is a perspective view of a handle strap integrally molded to the outer periphery of the top filter of a filter cell cartridge assembly.

In a third preferred embodiment as shown FIG. 6, integral with the molded edge 14 of a top filter cell 12, is a lifting strap, generally designated by the numeral 70. The lifting strap 70 comprises ends 72 integrally connected to the edge 14 with an interconnecting handle 74 therebetween. As illustrated in FIG. 6, it should be appreciated that the curvature of the handle 74 is such that there is enough clearance between the handle 74 and the filtration area 16 for the technician to insert his or her hands to lift the cartridge assembly 10 out of the filter housing. It should further be appreciated that there may be more than one lifting strap 70 integrally molded to the outer edge 14. Furthermore, in addition to the handle 74 being connected at both ends to the edge 14, a center portion of the handle may also be connected to the retainer ring 22. This center connection would provide additional stability during the lifting operation. Of course, the lifting strap 70 is of the same material as the edge 14, typically this material is made of a rigid yet flexible plastic. Moreover, the lifting straps 70 are configured such that they will not interfere with the normal operation of the filter housing.

Figure 7:
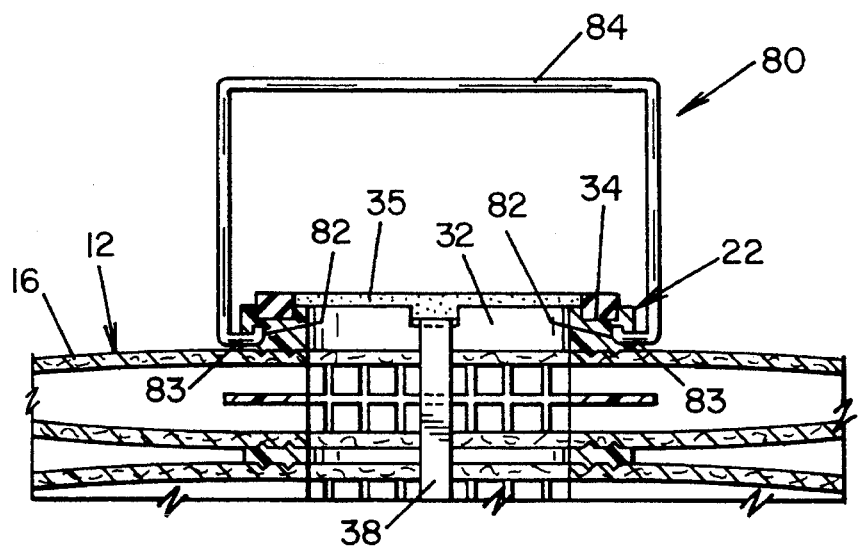
FIG. 7 is a partial cross sectional view of an upper retainer ring with a lifting handle affixed thereto to be used in lifting and carrying a filter cell cartridge assembly.

In a fourth embodiment, a ring strap or handle generally designated by the numeral 80, is shown in FIG. 7. The top retainer ring 22 is configured as in the previous embodiments, however, a pair of diametrically opposed recesses 82 are provided on the exterior thereof. The recesses 82 are configured so as to receive the opposed ends 83 of a lifting handle 84. It should be appreciated that the lifting handle 84 may be inserted into and received by the recesses 82. Accordingly, the filter cartridge assembly 10 is lifted away from the inlet or outlet with which it is in cooperation. The material of the lifting handle 84 is made of a suitable material such as spring steel or plastic. In other words, the lifting handle 84 is made of a material flexible enough to be inserted into the recesses 82, yet strong enough to lift a wet filter cartridge assembly 10. Owing to the inwardly directed tips of ends 83, a hook or J-shaped configuration is provided which resists the tendency of the handle 84 to pull free from the retainer ring 22 under load. Of course, the ring 22 is sufficiently flexible to allow the installation of handle ends 83 therein.

Figure 8:
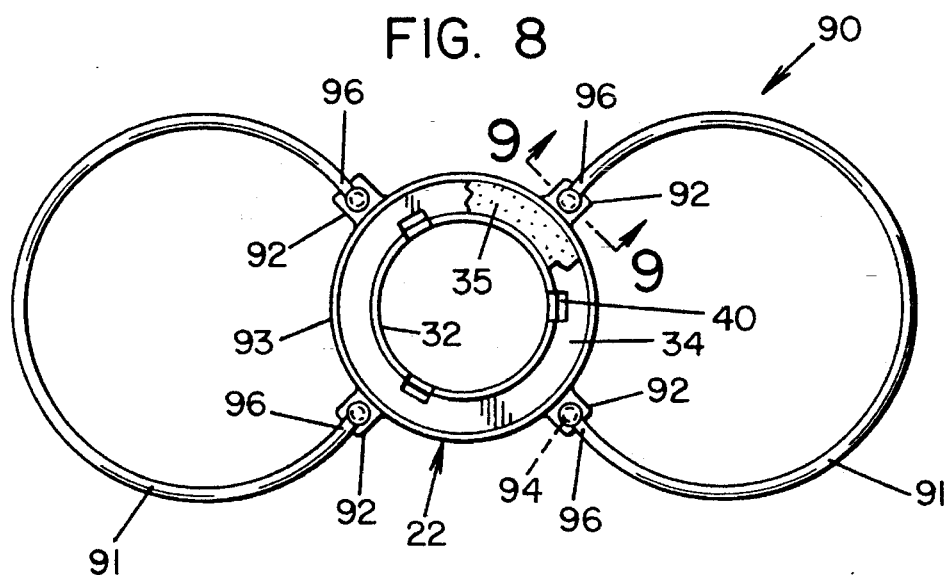
FIG. 8 is a top plan view of alternative embodiment handle which can be attached to a retainer ring, which is interconnected with a top cell of the filter cell cartridge assembly.
Figure 9:
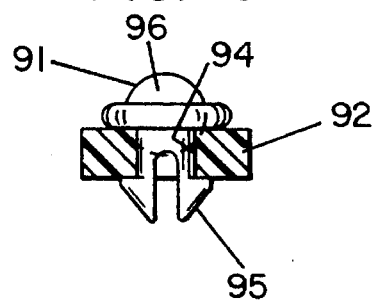
FIG. 9 is a cross-section taken substantially along line 9—9 of FIG. 8.

With reference to FIGS. 8 and 9, a fifth embodiment is provided somewhat similar to the lifting strap 41 depicted in FIGS. 2 and 3. In particular, lifting means 90 comprises twin lifting straps 91 and a modified top retainer ring assembly 22. The latter is made with a plurality of tabs 92, extending radially outwardly from the outer surface 93 of retainer ring 22, each of which carries an aperture 94 for receipt of a pointed foot member 95. Foot members 95 extend perpendicularly from the opposed ends 96 of lifting straps 91 and are joined to the retainer ring 22 by engagement with the apertures 94. The material for the lifting straps 91, which are typically made of plastic, is rigid enough to support the weight of a wet filter cartridge assembly 10, while still allowing the straps 91 to be flexible for manipulation in conjunction with lifting the assembly out of the filter housing 28. In the preferred embodiment, the lifting straps 91 are mounted in a fashion to provide twin opposed ovals; however, it should be appreciated that the straps 91 may be configured in any other shape that is conducive to lifting a wet cartridge assembly 10. Furthermore, although the straps 91 are shown as removably attached to the retainer ring 22, it is to be understood they could as well be integrally molded therewith and therefore no attempt has been made to depict such an embodiment.

Thus, it can be seen by those skilled in the art, that the removal of a wet filter cartridge assembly is greatly facilitated by using the present invention. It should also be apparent that the use of an integral or subsequently attached lifting strap provides reduced operator exposure to the fluid stream and contaminants being filtered.

Based upon the foregoing disclosure, it should now be apparent that the use of the device and the method described herein will carry out the object set forth hereinabove. It should also be apparent to those skilled in the art that the method of the present invention can be practiced with a variety of different size filter cartridges and handle configurations.

It is, therefore, to be understood that any variations evident fall within the scope of the claimed invention and thus, the selection of the cartridge assembly and the configuration of the lifting means communicating with the cartridge assembly can be determined without departing from the spirit of the invention herein disclosed and described. Moreover, the scope of the invention shall include all modifications and variations that may fall within the scope of the attached claims.

We claim:

1. Removable filter cartridge assemblies for housings having a removable cover and an inlet and an outlet to and from the interior thereof comprising:

at least one filter cell through which fluids are passed for filtration, said cell having a central aperture therethrough for the passage of fluid, separate from the fluid within the housing; opposed disks of filtration media, spaced apart and defining upper and lower surfaces of said cell emanating radially from said central aperture; and, an outer peripheral edge circumscribing said cell;

a retainer ring securably disposed on said filter cell open to and concentric with said central aperture, said retainer ring being contiguous with said central aperture and with either the inlet or outlet of the housing; and lifting means communicable with said retainer ring for movement of said filter cell into and out of the filter housing, wherein a sealing interface is provided between the retainer ring and the inlet or outlet of the housing.

2. Filter cartridge assemblies, according to claim 1, wherein said lifting means comprises at least one handle loop integrally extending from said retainer ring.

3. Filter cartridge assemblies, according to claim 1, wherein said lifting means and said retainer ring are made from plastic.

4. Filter cartridge assemblies, according to claim 1, wherein said lifting means comprises at least one handle loop removably engageable with said retainer ring.

5. Filter cartridge assemblies, according to claim 4, wherein said lifting means comprises a second handle loop integrally extending from said retainer ring opposite said one handle loop.

6. Filter cartridge assemblies, according to claim 4, wherein said handle loops are made from plastic.

7. Filter cartridge assemblies, according to claim 1, further comprising:

a plurality of interconnected filter cells having concentric apertures therethrough; and at least one band means for fastening said plurality of cells together, wherein said central apertures are open to and communicable with successive apertures of said cells.

8. Filter cartridge assemblies, according to claim 7, wherein said retainer ring is carried by the upper surface of the uppermost filter cell.

9. Filter cartridge assemblies, according to claim 7, wherein said retainer ring is carried by the lower surface of the lowermost filter cell.

10. Filter cartridge assemblies, according to claim 9, wherein said lowermost retainer ring provides an interior surface from which inwardly extend a plurality of bosses, said bosses having apertures therethrough.

11. Filter cartridge assemblies, according to claim 10, wherein said handle comprises at least one plastic strand having opposed ends coupled with said boss apertures for removal of said cartridge assembly.

12. A method for the assembly of a cell-type filter cartridge device disposed within a filter housing and having a removable cover, an inlet and an outlet, comprising the steps of:

providing at least one filter cell, through which fluids are passed for filtration, said cell having a central aperture therethrough for the passage of fluids, separate from the fluid within the housing; opposed disks of filtration media, spaced apart and defining upper and lower surfaces of said cell emanating radially from said central aperture; an outer peripheral edge circumscribing said cell and a retainer ring securably disposed on said filter cell open to and concentric with said central aperture, said retainer ring being contiguous with said central aperture and with either the inlet or outlet of the housing;

providing lifting means communicable with said retainer ring for movement of said filter cell into and out of said filter housing, wherein a sealing interface is provided between the retainer ring and the inlet or outlet of the housing;

depositing said filter cell into said filter housing via said lifting mean; and fastening said removable cover to said filter housing.

13. A method according to claim 12, including the additional steps of providing a plurality of said filter cells; and interconnecting said filter cells by at least one band to form a stack of cells, the apertures of said cells being concentrically aligned with said aperture of the first said cell.

14. A method for removing a filter cell cartridge assembly from a filter housing having a removable cover, an inlet and an outlet; the cartridge assembly providing at least one filter cell, said filter cell having a central aperture therethrough for the passage of fluid, separate from the fluid within the housing; opposed disks of filtration media, spaced apart and defining upper and lower surfaces of said cell emanating radially from said central aperture; an outer peripheral edge circumscribing said cell and a retainer ring securably disposed on said filter cell open to and concentric with said central aperture, said retainer ring being contiguous with said central aperture and with either the inlet or outlet of the housing, comprising the steps of:

detaching the cover from said filter housing;

securing means for lifting to said retainer ring, wherein a sealing interface is provided between the retainer ring and the inlet or outlet of the housing when the housing is closed; and lifting said filter cell out of said filter housing with said means for lifting.

15. Removable filter cartridge assemblies for housings having a removable cover and an inlet and an outlet to the interior thereof comprising:

at least one filter cell through which fluids are passed for filtration, said cell having a central aperture therethrough for the passage of fluid, separate from the fluid within the housing; opposed disks of filtration media, spaced apart and defining upper and lower surfaces of said cell emanating radially from said central aperture; and, an outer peripheral edge circumscribing said cell;

a retainer ring securably disposed on said filter cell open to and concentric with said central aperture, said retainer ring being contiguous with said central aperture and with either the inlet or outlet of the housing, wherein a sealing interface is provided between the retainer ring and the inlet or outlet of the housing and lifting means extending from said outer peripheral edge for movement of said filter cell into and out of the filter housing.

16. A method for the assembly of a cell-type filter cartridge device disposed within a filter housing and having a removable cover, an inlet and an outlet, comprising the steps of:

providing at least one filter cell, through which fluids are passed for filtration, said cell having a central aperture therethrough for the passage of fluid, separate from the fluid within the housing; opposed disks of filtration media, spaced apart and defining upper and lower surfaces of said cell emanating radially from said central aperture; an outer peripheral edge circumscribing said cell and a retainer ring securably disposed on said filter cell open to and concentric with said central aperture, said retainer ring being contiguous with said central aperture and with either the inlet or outlet of the housing, wherein a sealing interface is provided between the retainer ring and the inlet or outlet of the housing when the housing is closed;

providing lifting means extending from said outer edge, for movement of said filter cell into and out of said filter housing;

depositing said filter cell into said filter housing via said lifting means; and fastening said removable cover to said filter housing.

* * * * *